United States Patent
Garrido et al.

(10) Patent No.: US 8,363,841 B2
(45) Date of Patent: Jan. 29, 2013

(54) METHOD FOR MANAGING AND CONTROLLING THE ACCESS KEYS TO SERVICES IN A COMMUNICATION SYSTEM

(75) Inventors: Eric Garrido, Montmorency (FR); Sandrine Agagliate, Paris (FR)

(73) Assignee: Thales, Neuilly sur Seine (FR)

( * ) Notice: Subject to any disclaimer, the term of this patent is extended or adjusted under 35 U.S.C. 154(b) by 1018 days.

(21) Appl. No.: 12/280,614

(22) PCT Filed: Feb. 28, 2007

(86) PCT No.: PCT/EP2007/051915
§ 371 (c)(1), (2), (4) Date: Feb. 17, 2009

(87) PCT Pub. No.: WO2007/099128
PCT Pub. Date: Sep. 7, 2007

(65) Prior Publication Data
US 2009/0310788 A1    Dec. 17, 2009

(30) Foreign Application Priority Data
Feb. 28, 2006    (FR) ..................... 06 01773

(51) Int. Cl.
*H04L 9/08*    (2006.01)
(52) U.S. Cl. ........ 380/279; 380/277; 380/278; 380/281; 380/284; 380/44; 380/46
(58) Field of Classification Search ............... 380/279, 380/277, 278, 281, 284, 44, 46
See application file for complete search history.

(56) References Cited

U.S. PATENT DOCUMENTS

| | | | | |
|---|---|---|---|---|
| 4,464,678 | A * | 8/1984 | Schiff et al. | 380/239 |
| 5,253,294 | A * | 10/1993 | Maurer | 380/264 |
| 7,512,240 | B2 * | 3/2009 | Lain et al. | 380/277 |
| 7,739,501 | B2 * | 6/2010 | Kimmel et al. | 713/168 |
| 2002/0006202 | A1 * | 1/2002 | Fruehauf et al. | 380/260 |
| 2005/0013440 | A1 * | 1/2005 | Akiyama et al. | 380/277 |
| 2005/0063546 | A1 * | 3/2005 | Kudo | 380/277 |

FOREIGN PATENT DOCUMENTS
FR     2831365     4/2003

* cited by examiner

*Primary Examiner* — Krista Zele
*Assistant Examiner* — James Forman
(74) *Attorney, Agent, or Firm* — Lowe, Hauptman, Ham & Berner, LLP

(57) ABSTRACT

A method for managing keys making it possible for a user to access one or more given services S in a communication system, in which the user is not able to be continuously connected to this service. A key K(t) is generated, which provides access to the service of day [t] for all the $t < t_{fin}$ by using a one-way function in the following manner (a one-way function being defined as being a function for which it is not currently possible by computing means to obtain the inverse function). A root key $K(t_{fin})$ is used and the key $K(t_{fin-1})$ is generated for the day $[t_{fin-1}]$ prior to the day $t_{fin}$, by using a function f such that $K(t_{fin}-1)=f(K(t_{fin}))$. The new value of key $K(t_{fin-1})$ is used in order to generate the key for the previous day $K(t_{fin-2})$ and this step is reiterated over the limited time period of day [t] to day [t+d] in order to obtain the chain K(t+d−1), K(t+d−2), etc. Each day t the key K(t+d) is sent to the users or user group having a trust level d (giving potential access to the service for d consecutive days).

4 Claims, 3 Drawing Sheets

METHOD FOR MANAGING AND CONTROLLING THE ACCESS KEYS TO SERVICES IN A COMMUNICATION SYSTEM

CROSS-REFERENCE TO RELATED APPLICATIONS

The present Application is based on International Application No. PCT/EP2007/051915, filed on Feb. 28, 2007, which in turn corresponds to French Application No. 0601773, filed on Feb. 28, 2006, and priority is hereby claimed under 35 USC §119 based on these applications. Each of these applications are hereby incorporated by reference in their entirety into the present application.

FIELD OF THE INVENTION

The present invention relates to a method and a system for managing keys making it possible for a user to access a given service, the user not being able to be connected continuously to this service. It applies, for example, to a radio communication system in which the authorized receivers share one and the same traffic key. It may also be used in a satellite navigation system in which the authorized receivers or users share a key allowing access to the "secret" signals broadcast in space.

BACKGROUND OF THE INVENTION

In the abovementioned systems, the users of one and the same service S share a common key providing access to this service. This traffic key must be renewed periodically in order to ensure the security of the system.

A management center is capable of broadcasting a new traffic key value buried in the service S itself, by using a limited bandwidth.

The key management for the traffic keys requires the resolution of the following compromise:
  periodically, session after session, the key must be changed and access to the service must be controlled,
  access to the service must be made as transparent as possible for authorized users who may not always be connected to the service.

The main object of this function called OTAR ("Over The Air Rekeying") is to provide the authorized users with transparent access to the service. For a given user, access is all the more transparent:
  if he is capable of retaining the knowledge of the future traffic keys by preventing the use of other means of distribution than the service S itself, such as a manual offline distribution of the keys for example;
  if he can sometimes be disconnected and consequently lose several messages broadcast by the OTAR function.

SUMMARY OF THE INVENTION

The invention relates to a method for managing keys making it possible for a user to access one or more given services S in a communication system, the user not being able to be continuously connected to this service, characterized in that it comprises at least the following steps:
  generating a key $K(t)$ providing access to the service of day [t] for all the $t < t_{fin}$ by using a one-way function in the following manner:
    using a root key $K(t_{fin})$ and generating the key $K(t_{fin-1})$ for the day $[t_{fin-1}]$ prior to the day $t_{fin}$, by using a function f such that $K(t_{fin}-1)=f(K(t_{fin}))$,
    using the new value of key $K(t_{fin-1})$ in order to generate the key for the previous day $K(t_{fin-2})$ and reiterating this step over the limited time period of day [t] to day [t+d] in order to obtain the chain $K(t+d-1)$, $K(t+d-2)$, etc.
  sending each day t the key $K(t+d)$ to the users or user group having a trust level d (giving potential access to the service for d consecutive days).

A function called one-way is defined, in the present invention, as being a function for which it is not currently possible by computing means to obtain the inverse function.

The method comprises, for example, the following steps: toward the end of the period of validity of the current chain for the traffic key, the receivers or users having a trust level d for a first period and a trust level d* for a second period store two types of traffic keys:
  A current traffic key $K(t+d)$ allowing access for the last days under the control of the current chain $K(\ )$, with the trust level d,
  A second traffic key $K^*(t+d^*)$ allowing access for the future days under the control of a new chain $K^*(\ )$ with a trust level d* which may be different from the trust level d.

More precisely, if the period of transition between the chain $K(\ )$ and the chain $K^*(\ )$ consists of r consecutive days from day [T0] to day [T0+r−1] inclusive, then for each user group G of trust level d for the chain $K(\ )$ and d* for the chain $K^*(\ )$, a function OTAR associated with the group G car, for example, broadcast the following information:
  before the transition period:
    $K(t+d)$ each day [t] with t<T0, in order to give potential access to the service during the sliding time window [t, t+d],
  during the transition period:
    $K(t')$ each day [t] with $T0<=t<T0+r$, where t' is the minimum between (t+d) and (T0+r−1), in order to retain access to the service up to the last day [T0+r−1] of activation of the chain $K(\ )$,
    $K((t+d^*)$ for each day [t] with $T0+m<=t<T0+r$, where m is the maximum between 0 and (r−d*), in order to give a valid future access key of the new chain $k^*(\ )$,
    d, if the new trust level d* is different from the old level d,
    the date [T0+r] of activation of the new chain $K^*(\ )$,
  after the transition period:
    $K^*(t+d^*)$ for each day [t] with $T0+r<=t$
    (in order to provide potential access to the service during the sliding time window [t,t+d*]).

The function f is, for example, a cryptographic function or a function based on hashing functions.

The invention also relates to a system for managing the keys making it possible for a user to access one or more given services S in a communication system, the user not being able to be connected continuously to this service, characterized in that the generation of an access key to the service S for a period corresponding to the trust level d allocated to a user or a user group, characterized in that it comprises in combination at least the following elements: a management center suitable for generating keys using the steps of the method described above.

The present invention makes it possible, for a service whose access is controlled by a traffic key that is renewed regularly, every day for example, to provide transparent access to the service to receivers that may be switched off for up to d days, where d corresponds to the trust level that is allocated to them.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

In order to ensure that the object of the invention is better understood, the following description is given for a satellite communication system 1 in which the users or the user groups authorized to access a service S share an access key K (the key for access to S is buried in the service). The system notably comprises a key management center 2.

As an example, a period of validity for the traffic key is chosen at one day, but it may be spread over any period. If the validity period is T, then, to apply the principle according to the invention, the word "day" in the description must be replaced by the expression "validity period of the key" or "T-period".

Scheme for Computing "One-Way Backward" Traffic Keys

Figure 2:
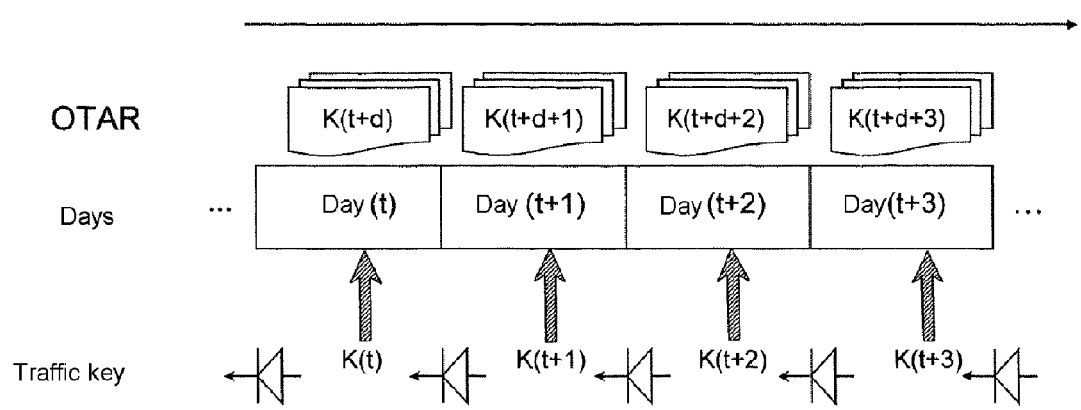
FIG. 2—a diagram of the routine access procedure.

FIG. 2 schematizes how the key management center renews the traffic key K and broadcasts it to the users (or receivers).

FIG. 2 schematizes, when going through from top to bottom, the OTAR function transmitting every day continuously a future access key to the users authorized to access a given service S. One line mentions the days, one line schematizes the access key $K(t)$ of the day t. This last line shows, by diodes, the one-way function making it possible to compute the day's key $K(t)$ from the key of the next day $K(t+1)$, without the inverse computation being possible.

The key K is renewed every day. The key that is current and active for the day t is marked $K(t)$.

In order to retain an operationally simple refresh of the traffic key for a standalone authorized receiver, the idea used by the method according to the invention consists notably in deriving the successive traffic keys from a single secret parameter.

This is obtained, for example, by making use of the diagram described in FIG. 2.

The general principle lies notably in the following two rules:

Rule No 1: "Backward" Characteristic

The key $K(t)$, for the day [t], is determined from the key $K(t+1)$ corresponding to the day $[t+1]$ after the day [t]

$$K(t)=K\_DERIVE(K(t+1)).$$

Rule No 2 "One-Way" Characteristic

The derivation function $f=K\_DERIVE$ is a one-way function, that is to say that it is easy to compute $y=f(x)$ from x, but it is impossible to obtain, by computation, an input x verifying $y=f(x)$ for any given image y.

The function f may be a cryptographic function, such as for example an encryption function or a function based on hashing functions.

Figure 1:
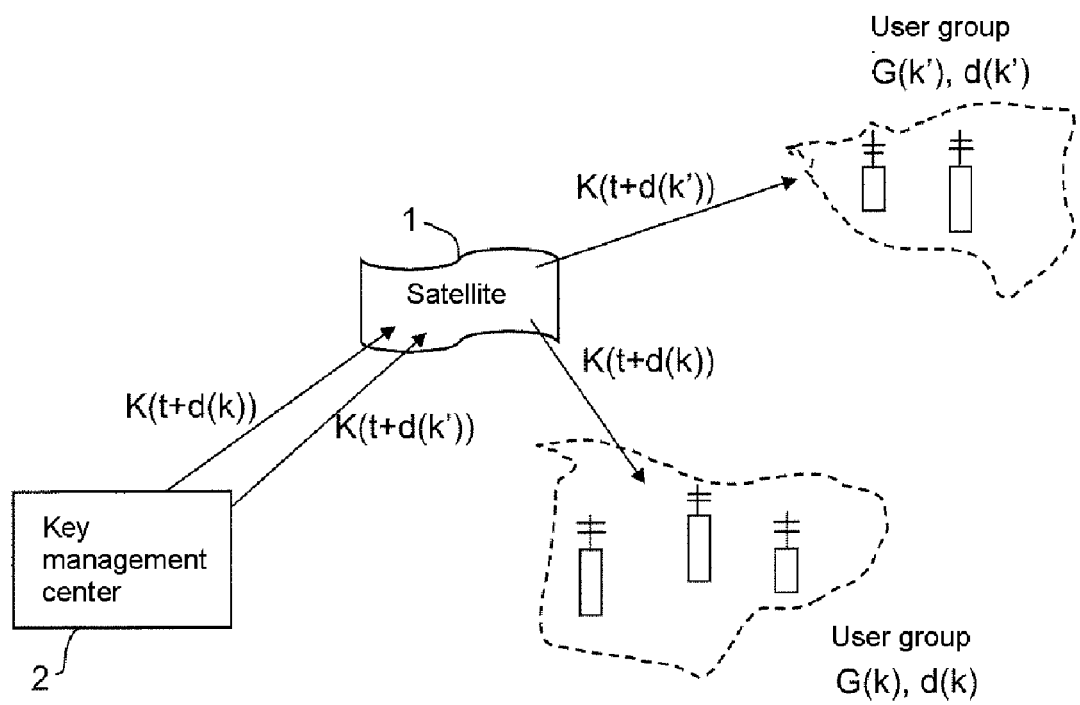
FIG. 1—a system diagram comprising a satellite and several user groups.

The diodes schematized in FIG. 1 reflect these two "backward" and "one-way" characteristics.

The management center of the system, responsible for managing the keys, uses this scheme to determine a complete chain of traffic keys for a given period: $K(t_0), K(t_0+1), \ldots, K(t_0+365), \ldots, K(t_{fin})$ being able to cover a time period of a year or more.

A new chain is determined, for example once a year, by the management center using a root key corresponding to the last traffic key of the chain $K(t_{fin})$ and of all the other traffic keys determined from $K(t_{fin})$ for the time period $t_0 \leq t \leq t_{fin}$.

For this, rule No 1 is used $$K(t_{fin}-1)=K\_DERIVE(K(t_{fin}));$$

$$K(t_{fin}-2)=K\_DERIVE(K(t_{fin}-1));$$

$$K(t_0)=K\_DERIVE(K(t_0+1)).$$

At the receiver or user, this rule is also used to reconstruct the subsets of the total chain.

During the crypto period of the overall chain of the traffic key K(.), a receiver authorized for the current day [t] has only one intermediate traffic key $K(t+d)$, where d corresponds to the trust level allocated to a user or receiver.

Based on the value of $K(t+d)$, the user computes all the traffic keys $K(t+d-1), K(t+d-2), \ldots, K(t)$ by applying rule No 1 in an iterative manner.

This subchain gives him potential access to the services for which he is authorized for a limited time period from the day [t] to the day [t+d]. However, thanks to the property of the cryptography function used (rule 2 mentioned above), he cannot deduce the future traffic keys $K(t+d+1), K(t+d+2)$ corresponding to the days [t+d+1].

The method according to the invention notably makes it possible to control in a flexible manner the access capability of the user groups (receivers) with different "a priori trust levels".

A user will always manage an intermediate traffic key $K(t+d)$ where the value of d is selected according to the a priori trust level of the user and provides access over a limited time window $[day[t], \ldots day[t+d]]$.

To continue accessing the service after this period d, the authorized user must obtain new valid traffic keys K( ). The two possible distribution means for valid traffic keys are, for example, the aforementioned OTAR function and the distribution of "offline" keys.

Daily Function Associated with a User Group

For a user who is authorized and has an active traffic key, one way of maintaining his access capability is to use the OTAR function provided by the service.

Users having one and the same trust level form a group. Operationally, it is preferable for the number of groups to remain limited.

A specific OTAR function is then defined for each of these groups G. The messages corresponding to this OTAR function are specific and different for each group.

1) The OTAR message of a group G(k) is encrypted at the application with a specific broadcast scheme called BES (Broadcast Encryption Scheme).

A member of a group G(k) has access only to the OTAR function associated with the group. The BES is used to control which users of the group have access to the future traffic key broadcast by the message delivered by the OTAR function to the group.

2) An OTAR message mainly transmits the future traffic key K(t+d). This key is specific to each group, the parameter d being able to be different as a function of the groups, depending on the trust level of the group.

The generic OTAR function is carried out day after day. During the day [t], the function transmits continuously to the members of a particular group with trust level "d" the corresponding traffic key K(t+d) that allows them to compute all the keys K(t+d) to K(t+1).

During the next day, day [t+1], the OTAR function will transmit to the member of the group the key K(t+d+1) and so on.

Trust Level Management

The trust level parameter d is an important parameter that may be selected day after day in order to control access to the service in a flexible manner. A security policy makes it possible to select the parameter d(k) for each group G(k) and to modify it day after day in the event of risk.

The current value of the trust level of the group G(k) during the day [t] is marked d(k)[day(t)] in order to emphasize the fact that it potentially depends on the group G(k) and the day.

From an operational point of view, d also fixes explicitly the autonomy of the receiver, that is to say the maximum time during which a receiver may be switched off and again access the service without having to use an offline means to obtain a valid traffic key.

A user having a trust level d on the day [t] will continue to access the service normally after the day [t+d] if at least one transmission of the OTAR function has been a success during the consecutive days preceding day [t], day [t+1], . . . day [t+d−1].

If there is really no need to deny a user (that is to say prevent him from accessing the service), d may be selected of be large, in order to increase the probability of transparent access to the service, even in difficult operational conditions (for example a fairly long disconnection of access to the service).

In the event of risk, "denial" management policies are possible.

In the case of low risk, the access capability of the most risky groups may be reduced (reducing the security level d to d'<d). In this case, the corresponding OTAR function will transmit during the current day [t] a characteristic future key K(t+d'), with d'<d.

In the event of high risk, the OTAR function will provide no information to the groups that are no longer authorized (d'=0).

When a group G(k) is denied on the day [t], the OTAR function will provide no more information relating to the traffic keys than that which it had at the time [t]. If, at the beginning of the "denial" process, the trust level of the group was d(k), the users will be able to generate the traffic keys K(t) to K(t+d(k)) and will not be able to generate K(u) for u>t+d(k). The users will therefore have access to the service again d(k) days after the group is denied (the latency time of d(k) days but not more).

Specifically, the period before the "denial" is absolutely guaranteed is d(k) days.

The "denial" of the particular group G(k) of trust level d(k) does not change the access condition for the users of the other groups who are still authorized. A user of another authorized group G(k') will continue to access the service normally during the day [t+d(k')] if at least one transmission of the OTAR function has been received successfully during the consecutive preceding days [t], [t+1], . . . [t+d(k')−1].

This condition is independent of the denial of the group G(k). Since this denial procedure has no effect on the groups that are still authorized, it will be called a "soft" procedure of group denial.

With this standard denial procedure, the period before the denial of the group G(k) takes effect is d(k) days. Sometimes, this time will be reduced for reasons of security.

If the denied group has, for a considerable time, been identified as a risk group, its allocated trust level d(k) may be preventively reduced to a few days or reduced to the minimum to one day in order to be certain of being able to deny this group within a minimum of 1 day.

If the trust level of this group is not reduced preventively, it is then possible to use a procedure making it possible to reduce the time of d(k) days before the denial is effective.

This emergency group denial is called a "hard" procedure of group denial. It is possible to temporarily change the conditions of access to the service for the other authorized groups. This is based on the renewal of the traffic key chains as explained below.

Renewal of the Traffic Key Chain and "Hard" Denial

In certain cases, it is possible to impose a renewal of a traffic key chain K( ) before the normally planned end, in order to reduce the time in d(k) days before the denial of a group G(k) is effective. This renewal concerns all the users of the service S (therefore all the groups G(k)) since they must share a common key providing access to S. The following procedure applies to each of the groups. Let G be a group of trust level d.

Toward the end of the validity period of the current chain K( ) for the traffic key K(t+d), the receivers or users will store two types of traffic keys:

A current traffic key K(t+d) allowing access for the last days under the control of the current chain K( ), with the trust level d, A second traffic key K*(t+d*) allowing access for the future days under the control of a new chain K*( ) with a trust level d* which may be different from the trust level d.

Figure 3:
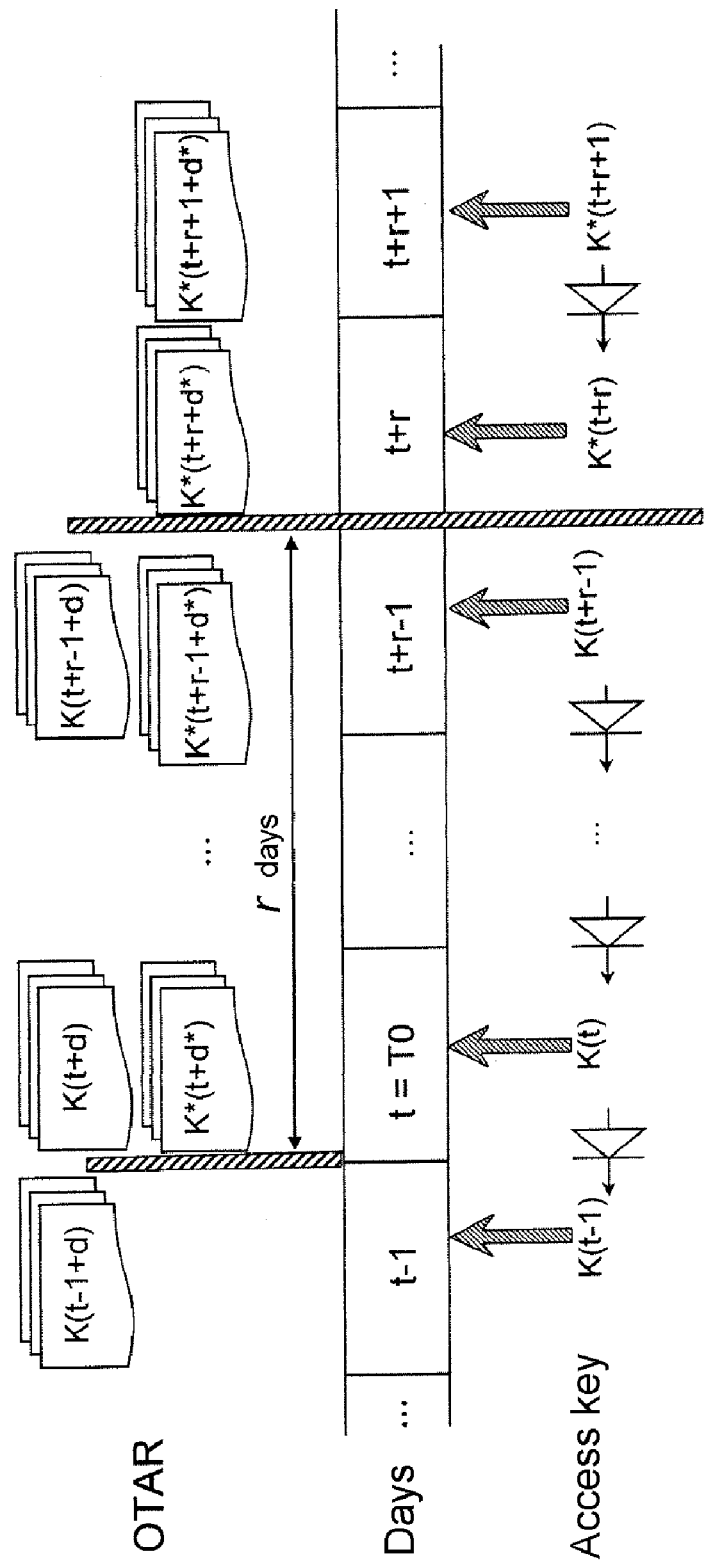
FIG. 3—a diagram of the renewal of the access key.

FIG. 3 schematizes a generic manner for the key renewal or refresh procedure.

For each current day [u], the "access key" line corresponds to the traffic keys K(u) in use for the day [u], on the "OTAR" line, FIG. 2 specifies the traffic keys K(u') that are transported in the daily OTAR message during the current day [u], r is a parameter that fixes the time window that is still under the time control of the old traffic key K( ) but in which the current OTAR function gives the values of the future traffic keys of the new chain K*( ), d (respectively d*) is the current trust level of the group associated with the chain K( ) (respectively K*( )).

Following this procedure, access for the various groups is temporarily controlled by the parameter r.

1) The condition for retaining transparent access (not necessary for resetting the service) for the groups that are still authorized is as follows:

A user of trust level d must be active and access the OTAR function for at least one day in the time window of r' consecutive days preceding the date of activation of the chain K*( ), where r' is the minimum between r, d and d*, always under the control of the old traffic keys, in order to collect a valid traffic key of the chain K*( ).

2) The absolute denial (no valid traffic key) is guaranteed under the following condition:

A group for which denial is requested on the day [t] and which has trust level d no longer has access to the service on the day [t+r″], where r″ is the minimum between r and d, if the corresponding OTAR function during this same time window is disabled.

The parameters r and d may be modified day after day in order to adapt the denial capability according to the different degree of risk, and in order to manage the ratio: [time for denying a risky group]/[time for which a user may remain inactive without having to collect keys manually].

The exact information broadcast in the OTAR message in the case of a "hard" denial is as follows:

before the transition period before the day [T0]:

K(t+d) each day [t] with t<T0, in order to give potential access to the service during the sliding time window [t, t+d], during the transition period, between day [T0] and day [T0]+r−1]:

K(t') each day [t] with T0<=t<T0+r, where t' is the minimum between (t+d) and (T0+r−1), in order to retain access to the service up to the last day [T0+r−1] of activation of the chain K( ), K*(t+d*) for each day [t] with T0+m<=t<T0+r, where m is the maximum between 0 and (r−d*), in order to give a valid future access key of the new chain k*( ), d, if the new trust level d* is different from the old level d, the date [T0+r] of activation of the new chain K*( ), after the transition period, from day [T0+r]:

K*(t+d*) for each day [t] with T0+r<=t (in order to provide potential access to the service during the sliding time window [t,t+d*]).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for managing keys for a user to access one or more given services S in a communication system, the user not being able to be continuously connected to this service, comprising the following steps:

generating a key K(t) providing access to the service of day [t] for all the t<$t_{fin}$ by using a one-way function in the following manner:

using a root key K($t_{fin}$) and generating the key K($t_{fin-1}$) for the day [$t_{fin-1}$] prior to the day $t_{fin}$, by using a function f such that K($t_{fin}$−1)=f(K($t_{fin}$)), using the new value of key K($t_{fin-1}$) in order to generate the key for the previous day K($t_{fin-2}$) and reiterating this step over the limited time period of day [t] to day [t+d] in order to obtain the chain K( ) equal to K(t+d−1), K(t+d−2), . . . , K(t) and sending each day t the key K(t+d) to the users or user group having a trust level d;

toward the end of the period of validity of the current chain for the traffic key, the receivers or users having a trust level d for a first period and a trust level d* for a second period store two types of traffic keys:

current traffic key K(t+d) allowing access for the last days under the control of the current chain K( ), with the trust level d, and second traffic key K*(t+d*) allowing access for the future days under the control of a new chain K*( ) with a trust level d* which is different from the trust level d, wherein the new chain K*( ) is equal to K*(t+d*−1), K*(t+d*−2), . . . , K*(t), wherein, if the period of transition between the chain K( ) and the chain K*( ) includes r consecutive days from day [T0] to day [T0+r−1] inclusive, then for each user group G of trust level d for the chain K( ) and d* for the chain K*( ) a function OTAR associated with the group G broadcasts the following information:

before the transition period:

K(t+d) each day [t] with t<T0, in order to give potential access to the service during the sliding time window [t, t+d], during the transition period:

K(t') each day [t] with T0<=t<T0+r, where t' is the minimum between (t+d) and (T0+r−1), in order to retain access to the service up to the last day [T0+r−1] of activation of the chain K( ), K*(t+d*) for each day [t] with T0+m<=t<T0+r, where m is the maximum between 0 and (r−d*), in order to give a valid future access key of the new chain K*( ), d, if the new trust level d* is different from the old level d, the date [T0+r] of activation of the new chain K*( ), after the transition period:

K*(t+d*) for each day [t] with T0+r<=t.

2. A method for managing keys for a user to access one or more given services S in a communication system, the user not being able to be continuously connected to this service, comprising the following steps:

generating a key K(t) providing access to the service of day [t] for all the t<$t_{fin}$ by using a one-way function in the following manner:

using a root key K($t_{fin}$) and generating the key K($t_{fin-1}$) for the day [$t_{fin-1}$] prior to the day $t_{fin}$, by using a function f such that K($t_{fin}$−1)=f(K($t_{fin}$)), using the new value of key K($t_{fin-1}$) in order to generate the key for the previous day K($t_{fin-2}$) and reiterating this step over the limited time period of day [t] to day [t+d] in order to obtain the chain K( ) equal to K(t+d−1), K(t+d−2), . . . , K(t) and sending each day t the key K(t+d) to the users or user group having a trust level d;

toward the end of the period of validity of the current chain for the traffic key, the receivers or users having a trust level d for a first period and a trust level d* for a second period store two types of traffic keys:

current traffic key K(t+d) allowing access for the last days under the control of the current chain K( ), with the trust level d, and second traffic key K*(t+d*) allowing access for the future days under the control of a new chain K*( ) with a trust level d* which is different from the trust level d, wherein the new chain K*( ) is equal to K*(t+d*−1), K*(t+d*−2), . . . , K*(t), wherein, if the period of transition between the chain K( ) and the chain K*( ) is constituted of r consecutive days from the day [T0] to the day [T0+r−1] inclusive, then for each user group G of trust level d for the chain K( ) and d* for the chain K*( ) a function OTAR associated with the group G broadcasts the following information:

before the transition period:
  K(t+d) each day [t] with t<T0, in order to give potential access to the service during the sliding time window [t, t+d],
during the transition period:
  K(t+d) each day [t] with T0<=t<T0+r, in order to retain access to the service up to the last day [T0+r−1] of activation of the chain K( ),
  K*(t+d*) for each day [t] with T0<=t<T0+r, in order to give a valid future access key of the new chain K*( ),
  d*, if the new trust level d* is different from the old level d,
  the date [T0+r] of activation of the new chain K*( ),
after the transition period:
  K*(t+d*) for each day [t] with T0+r<=t.

3. A non-transitory computer readable medium containing instructions for managing keys for a user to access one or more given services S in a communication system, the user not being able to be connected continuously to this service, the generation of an access key to the service S for a period corresponding to the trust level d allocated to a user or to a user group, wherein the non-transitory computer readable medium comprises in combination at least one management center suitable for generating keys by performing the following steps:
  generating a key K(t) providing access to the service of day [t] for all the t<$t_{fin}$ by using a one-way function in the following manner:
    using a root key K($t_{fin}$) and generating the key K($t_{fin-1}$) for the day [$t_{fin-1}$] prior to the day $t_{fin}$, by using a function f such that K($t_{fin}$−1)=f(K($t_{fin}$)),
    using the new value of key K($t_{fin-1}$) in order to generate the key for the previous day K($t_{fin-2}$) and reiterating this step over the limited time period of day [t] to day [t+d] in order to obtain the chain K( ) equal to K(t+d−1), K(t+d−2), K(t) and
  sending each day t the key K(t+d) to the users or user group having a trust level d;
    toward the end of the period of validity of the current chain for the traffic key, the receivers or users having a trust level d for a first period and a trust level d* for a second period store two types of traffic keys:
      current traffic key K(t+d) allowing access for the last days under the control of the current chain K( ), with the trust level d, and
  second traffic key K*(t+d*) allowing access for the future days under the control of a new chain K*( ) with a trust level d* which is different from the trust level d, wherein the new chain K*( ) is equal to K*(t+d*−1), K*(t+d*−2), . . . , K*(t),
    wherein the management center is adapted for processing the following steps:
    wherein, if the period of transition between the chain K( ) and the chain K*( ) includes r consecutive days from day [T0] to day [T0+r−1] inclusive, then for each user group G of trust level d for the chain K( ) and d* for the chain K*( ) a function OTAR associated with the group G broadcasts the following information:
    before the transition period:
      K(t+d) each day [t] with t<T0, in order to give potential access to the service during the sliding time window [t, t+d],
    during the transition period:
      K(t') each day [t] with T0<=t<T0+r, where t' is the minimum between (t+d) and (T0+r−1), in order to retain access to the service up to the last day [T0+r−1] of activation of the chain K( ),
      K*(t+d*) for each day [t] with T0+m<=t<T0+r, where m is the maximum between 0 and (r−d*), in order to give a valid future access key of the new chain K*( ),
      d, if the new trust level d* is different from the old level d,
      the date [T0+r] of activation of the new chain K*( ),
    after the transition period:
      K*(t+d*) for each day [t] with T0+r<=t.

4. A non-transitory computer readable medium containing instructions for managing keys for a user to access one or more given services S in a communication system, the user not being able to be connected continuously to this service, the generation of an access key to the service S for a period corresponding to the trust level d allocated to a user or to a user group, wherein the non-transitory computer readable medium comprises in combination at least one management center suitable for generating keys by performing the following steps:
  generating a key K(t) providing access to the service of day [t] for all the t<$t_{fin}$ by using a one-way function in the following manner:
    using a root key K($t_{fin}$) and generating the key K($t_{fin-1}$) for the day [$t_{fin-1}$] prior to the day $t_{fin}$, by using a function f such that K($t_{fin}$−1)=f(K($t_{fin}$)),
    using the new value of key K($t_{fin-1}$) in order to generate the key for the previous day K($t_{fin-2}$) and reiterating this step over the limited time period of day [t] to day [t+d] in order to obtain the chain K( ) equal to K(t+d−1), K(t+d−2), K(t) and
  sending each day t the key K(t+d) to the users or user group having a trust level d;
    toward the end of the period of validity of the current chain for the traffic key, the receivers or users having a trust level d for a first period and a trust level d* for a second period store two types of traffic keys:
      current traffic key K(t+d) allowing access for the last days under the control of the current chain K( ), with the trust level d, and
  second traffic key K*(t+d*) allowing access for the future days under the control of a new chain K*( ) with a trust level d* which is different from the trust level d, wherein the new chain K*( ) is equal to K*(t+d*−1), K*(t+d*−2), . . . , K*(t),
    wherein the management center is adapted for processing the following steps:
    wherein, if the period of transition between the chain K( ) and the chain K*( ) is constituted of r consecutive days from the day [T0] to the day [T0+r−1] inclusive, then for each user group G of trust level d for the chain K( ) and d* for the chain K*( ) a function OTAR associated with the group G broadcasts the following information:
    before the transition period:
      K(t+d) each day [t] with t<T0, in order to give potential access to the service during the sliding time window [t, t+d],
    during the transition period:
      K(t+d) each day [t] with T0<=t<T0+r, in order to retain access to the service up to the last day [T0+r−1] of activation of the chain K( ),
      K*(t+d*) for each day [t] with T0<=t<T0+r, in order to give a valid future access key of the new chain K*( ),
      d*, if the new trust level d* is different from the old level d,
      the date [T0+r] of activation of the new chain K*( ),
    after the transition period:
      K*(t+d*) for each day [t] with T0+r<=t.

* * * * *